United States Patent [19]

Delalande et al.

[11] Patent Number: 4,811,914
[45] Date of Patent: Mar. 14, 1989

[54] WINDING WHEEL FOR HIGH-TEMPERATURE BAKING OF STACKED CAPACITORS

[75] Inventors: Francois Delalande; Serge Bon, both of St Pierre de Bresse, France

[73] Assignee: Compagnie Europeenne de Compasants Electroniques LCC, Courbevoie, France

[21] Appl. No.: 113,486

[22] Filed: Oct. 28, 1987

[30] Foreign Application Priority Data

Oct. 28, 1986 [FR] France .................................. 86 14977

[51] Int. Cl.$^4$ .............................................. H01G 4/30
[52] U.S. Cl. ..................................... 242/56.1; 242/68; 29/25.42
[58] Field of Search ................ 242/56.1, 7.06, 68, 242/68.5; 29/25.42; 277/26, 236; 220/435, 436, 440

[56] References Cited

U.S. PATENT DOCUMENTS 2,731,706  1/1956  Grouse .
3,506,895  4/1970  Kellerman .
4,128,926  12/1978  Gaenge et al. ..................... 29/25.42
4,225,054  9/1980  Jean ..................................... 220/436
4,602,795  7/1986  Lillibridge ......................... 277/236

FOREIGN PATENT DOCUMENTS 2752767  5/1979  Fed. Rep. of Germany .

Primary Examiner—Stuart S. Levy
Assistant Examiner—Steven M. duBois
Attorney, Agent, or Firm—Oblon, Fisher, Spivak, McClelland & Maier

[57] ABSTRACT

The invention pertains to a winding wheel for stacked capacitors, in the shape of a wheel body on which a rim is fixed in a detachable way, said rim having its circumference cut along a certain length and being clamped in a hoop made of a material with an expansion coefficient of zero. The cut length is calculated so that, when the rim and the hoop which clamps it are disconnected from the wheel body and carried to a determined temperature, the ends of the rim defined by the gap do not touch each other.

12 Claims, 3 Drawing Sheets

U.S. Patent    Mar. 14, 1989    Sheet 1 of 3    4,811,914
FIG_1
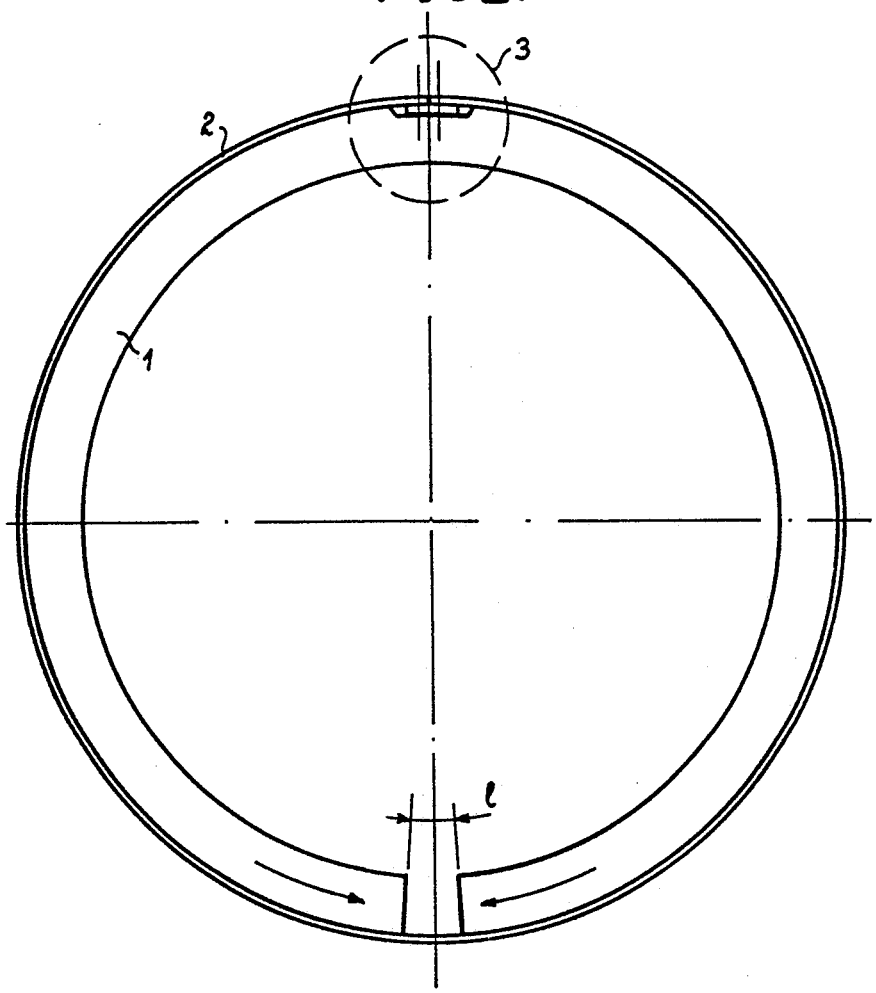
FIG_2
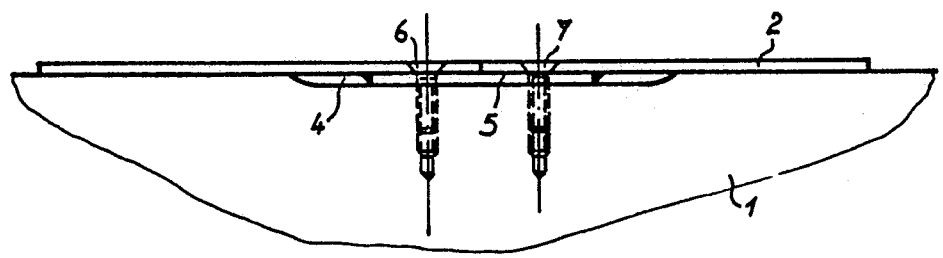

FIG_3
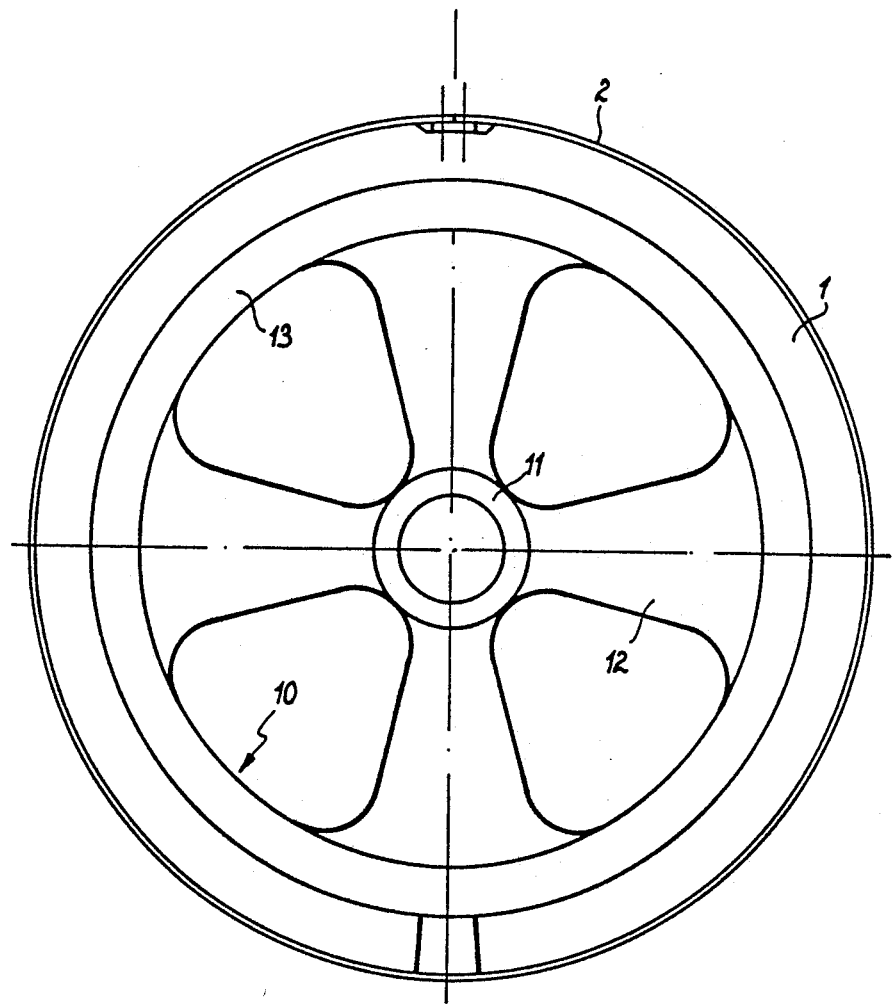

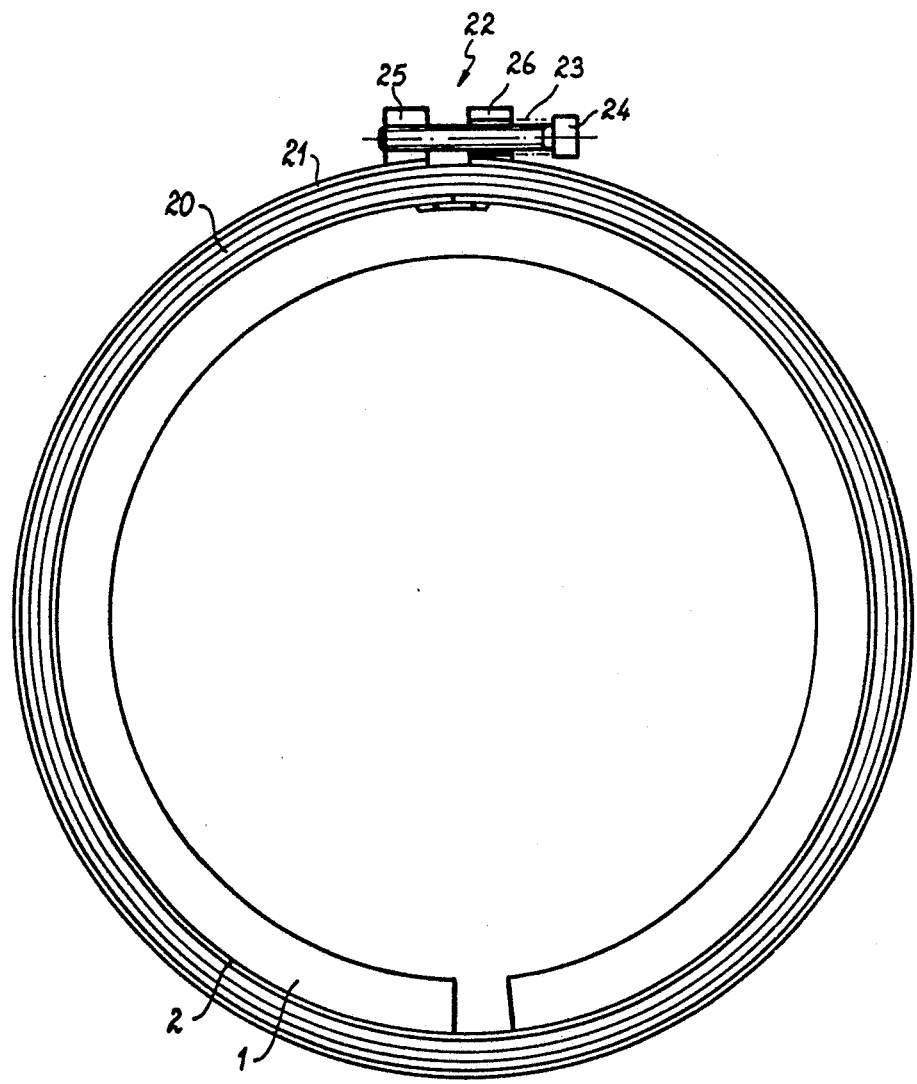
FIG_4

WINDING WHEEL FOR HIGH-TEMPERATURE BAKING OF STACKED CAPACITORS

BACKGROUND OF THE INVENTION

1. Field of the Invention

The present invention pertains to the manufacture of capacitors of the type that are stacked and obtained by winding on a large-diameter wheel.

2. Description of the Prior Art

This winding method is now widely used. Metallized dielectric films are generally used. The winding is done so as to make a lateral offset between two successive foils of the stack so that electrical contacts can subsequently be deposited on the sides of the stack. Once the stack is made, it is subjected to heat treatment intended to stabilize its electrical properties, especially the dielectric loss factor and the capacitance value. This heat treatment also gets rid of air inclusions between the foils of the stack. The treatment comprises an operation to press the stack directly on the winding wheel at fairly high temperatures (about 240° C.). The winding wheel is generally made of aluminum and its diameter is generally about 800 millimeters. The heat treatment causes the wheel to expand and consequently causes a major elongation of the mother capacitors during baking. Between 20° C. and 240° C., an aluminum wheel with a diameter of 800 mm. undergoes an elongation of 4 mm. in its diameter, corresponding to more than 12 mm. in its circumference.

The elongation that results from the mother capacitors counteracts the beneficial effects of the baking process itself. To remove this disadvantage, it is possible to use wheels made of materials with a zero expansion coefficient, for example, invar. These materials are, unfortunately, very expensive and are not used in this specific case because they excessively increase the cost price of the capacitors.

To remove these disadvantages, the invention proposes the use of a wheel of a special design which makes it posssible to associate different materials. The wheel according to the invention has several parts including, especially, a rim which is detachable from the wheel body and has a radial gap so that it can expand freely under the effect of heat. This rim, which is made of a material generally used in this type of technology (aluminium for example), is clamped by a hoop made of a material with an expansion coefficient which is zero or practically zero. The hoop therefore sets a constant external diameter for the wheel and enables the free expansion of the rim.

3. Summary of the Invention

An object of the invention is therefore a winding wheel for stacked capacitors, comprising a wheel body on which a rim is fixed detachably, the circumference of the said rim being cut along a certain length, the rim being clamped within a hoop made of a material with an expansion coefficient of zero, the said cut length being calculated so that, when the rim and the hoop which clamps it are disconnected from the wheel body and carried to a determined temperature, the ends of the rim defined by the cut do not touch one another.

BRIEF DESCRIPTION OF THE DRAWINGS

The invention will be better understood and its other advantages will appear from the following description, given as a non-exhaustive example and made with reference to the appended drawing, of which:

FIG. 1 shows the rim fitted with its hoop;

FIG. 2 is a detailed view of the FIG. 1;

FIG. 3 shows the winding wheel according to the invention;

FIG. 4 shows the stage for the heat processing of the mother capacitors.

DESCRIPTION OF THE PREFERRED EMBODIMENTS

In FIG. 1, the rim 1 is clamped in the hoop 2. The rim is a relatively thick circle so that it can maintain a certain degree of rigidity when it is suspended at one of its points. The material used to make it can be aluminum, which is frequently used to make winding wheels. The rim is interrupted along a certain length l. The diameter of the hoop 2 is such that, at winding temperature, the hoop clamps the rim 1. The gap in the circle of the rim makes it is easier to position the hoop around the rim. The rim can be fitted with grasping means so that the two ends of the cut circle can be brought closer together. If necessary, the hoop may take the shape of a cut circle so that it can be fitted more easily to the external diameter of the rim, or it may take the shape of a strip which is looped back on itself. The joint between the two ends of the hoop 2 must be clean so that the winding surface formed by the periphery of the hoop is as smooth as possible.

FIG. 2 shows a possible embodiment of the closing of the hoop when it is cut. This figure corresponds to the part marked 3 in FIG. 1. Before the hoop is positioned around the rim, its two precisely machined ends are joined, and a plate 5 with a curve substantially equal to that of the hoop is welded to the inner part of the hoop so as to fasten them permanently. A groove 4 is made in the rim to house the plate 5 when the hoop is positioned on the rim. The plate 5 is preferably made of the same material as the hoop.

The hoop should preferably be fixed to the rim at a point of its periphery. When the rim is heated, this type of fixing will contribute greatly to making the subsequent expansion cause its two ends to come together as shown by the two arrows in FIG. 1, rather than because of any deformation of the hoop caused by the mechanical pressure exerted by the rim. The sliding of the rim in the hoop on either side of their fastening point will be all the easier if this fastening point is diametrically opposite the gap made in the rim, as can be seen in FIG. 1.

In the practical example shown in FIG. 2, two screws 6 and 7, placed on either side of the gap in the hoop, have been chosen as fastening means between the rim 1 and the hoop 2. These screws go through the plate 5 and are fixed into the rim 1. Preferably, countersunk-head screws should be chosen so that the external surface of the hoop stays even.

The hoop is made using a material with an expansion coefficient of zero or practically zero, for example, invar. In the practical example of a rim made of aluminium with a diameter of 0.8 m., a hoop made of invar, with a thickness of 2 mm., can be used if the hoop is fixed to a point of the rim opposite to the gap of the said rim. The two parts of the rim can then expand freely, and the mechanical resistance of the hoop is sufficient to keep the wheel at a practically constant external diameter. The above rim, fitted with its hoop and carried to a temperature of 240° C., undergoes an expansion of 4/100 mm. in its external diameter, thus causing an elongation of 12/100 mm. in the length of the mother capacitors. This elongation is negligible with respect to the length of the mother capacitors (about 2.5 m.).

The operation for winding the mother capacitors is performed on the winding wheel shown in FIG. 3. The wheel has a wheel body 10 on which the rim 1, fitted with the hoop 2, is mounted. The wheel body has the conventional shape of a hub 11, with spokes 12 and a rim 13. The rim 1 can be fixed to the wheel body 10 by any means known to the specialist. The fixing method chosen will preferably be one that enables rapid dismantling.

It has been mentioned above that the circumference of an aluminium rim, with a diameter of 800 mm., should be capable of being elongated by about 12 mm. This elongation should take place in the cut portion of the rim with a length l. The length l will therefore be at least equal to 12 mm.

When the winding is done the rim, with its hoop and mother capacitors which are wound around it, is released from the wheel body and placed in an oven for the heat treatment of the mother capacitors. It is observed that, to carry out the heat treatment, it is enough to suspend the rim in the oven. The wheel body remains on the winding machine and can receive another rim. Another advantage of the invention is that there is no heat absorbed by the wheel body during heat treatment.

During the heat treatment process, the mother capacitors are usually covered with a holding and compacting hoop. It must be noted that, with the winding wheel according to the invention, the use of a hooping made of a material with a zero expansion coefficient is not obligatory. Advantageously, it is possible to use a hooping made of any metallic material mounted with a calibrated compensating spring. In this case, the spring absorbs the expansions of the hoop with a constant force. This is shown in FIG. 4. The mother capacitors which have the genera; reference 20 are wound on the hoop 2 of the rim 1. A holding hoop 21 clamps all the mother capacitors according to a technique which is well-known to the specialist. To compensate for its expansion due to the heat treatment, the hoop 21 is fitted with a clamping device 22 provided with a calibrated spring 23. Before the heat treatment, the hoop 21 is clamped to the mother capacitors by means of the screw 24 which goes freely through the bore of the element 26 joined to one of the arms of the hoop 21, and which is screwed into the element 25 joined to the other arm. During the heat treatment, the expansion of the hoop 21 causes the pressure that it exerts on the mother capacitors to be relaxed. The calibrated spring 23 placed between the element 26 and the head of the screw 24 then fulfils its function and clamps the hoop 21 against the mother capacitors.

The winding wheel of the invention can be used for the high-temperature baking of all dielectrics used for the manufacture of capacitors, in particular so-called "japanned" dielectrics and, especially, thermostable dielectrics such as polyhydantoins, polyphenyquinoxalines and polyimides.

The cost price of the winding supports is still low, with respect to both the material used (chiefly aluminium) and the machining process. The results obtained are as good as they would be if the winding wheel were made entirely of a material such as invar.

What is claimed is:

1. A winding wheel for stacked capacitors, comprising:
   a hoop formed of a material having a substantially zero thermal coefficient of expansion; and
   an annular rim clamped within said hoop so as to control an increase in the diameter of said rim, said hoop being fixed to said rim along a minor portion of the circumference of said rim, the circumference of said rim having a discontinuity of a certain circumferential length, said length being sufficient that ends of said rim on opposite sides of said discontinuity do not touch one another at a temperature sufficient to heat treat capacitors wound on said winding wheel.

2. A winding wheel according to the claim 1 wherein the rim is made of aluminium.

3. A winding wheel according to the claim 1 wherein the hoop is made of invar.

4. The winding wheel according to claim 1, wherein said minor portion of the circumference of the rim substantially comprises two points, one of said points being at each of said opposite ends.

5. A winding wheel according to claim 4 wherein the hoop is fixed to the rim by means of a screws.

6. A winding wheel according to claim 1 wherein the hoop is formed from a strip having two ends fixed to each other.

7. A winding wheel according to the claim 6 wherein the two ends of the said strip are fixed to each other by welding.

8. The winding wheel according to claim 7 wherein said minor portion of the circumference of the rim substantially comprises a point.

9. The winding wheel according to claim 8 wherein said point is diametrically opposite said discontinuity.

10. The winding wheel according to claim 6 including plate means for fixing the two ends of the strip to one another.

11. A winding wheel according to claim 10 wherein said plate means comprises a plate made of the same material as the hoop.

12. A winding wheel according to the claim 10 wherein the said rim comprises a groove designed to house the said plate means.

* * * * *